United States Patent [19]

Kummer

[11] Patent Number: 4,620,109

[45] Date of Patent: Oct. 28, 1986

[54] BOAT TRAILER LIGHT DE-ENERGIZATION MEANS

[76] Inventor: Robert F. Kummer, 2507 George St., Logansport, Ind. 46947

[21] Appl. No.: 730,863

[22] Filed: May 6, 1985

[51] Int. Cl.$^4$ ............................................. H02G 3/00
[52] U.S. Cl. .......................... 307/10 LS; 307/10 R; 340/67; 340/70; 280/422; 280/414.1
[58] Field of Search .................... 307/9, 10 LS, 10 R, 307/10 AT; 280/414.1, 422, 432; 340/70, 74, 67, 91, 81 R; 315/92, 93

[56] References Cited

U.S. PATENT DOCUMENTS

| | | | |
|---|---|---|---|
| 3,569,927 | 3/1971 | Guyton | 340/70 X |
| 3,818,438 | 6/1974 | Stacha | 340/70 |
| 3,821,560 | 6/1974 | Hansen | 307/10 LS |
| 3,938,122 | 2/1976 | Mangus | 340/67 |
| 4,013,996 | 3/1977 | Hubbard | 340/74 X |
| 4,024,497 | 5/1977 | Ruppel et al. | 340/74 |
| 4,270,115 | 5/1981 | Bonnett | 340/81 R X |

Primary Examiner—William M. Shoop, Jr.
Assistant Examiner—Shik Luen Paul Ip
Attorney, Agent, or Firm—Robert A. Spray

[57] ABSTRACT

A control module including circuitry therefor, which prevents short circuit conditions of a boat trailer's light-circuitry at the boat-launch site, in which at least two co-ordinated control circuits are provided to assure that none of the trailer circuits are energized while the trailer is in the water body of the lake or stream at the launch site. Both the circuits are provided as branches of the towing vehicle's own circuitry. One is provided to be a branch of the vehicle's backup lights' circuitry, utilizing the fact of the boat-launch and retrieval maneuver normally including a reverse-drive action of the towing vehicle, which assures energizing of that first control circuit. Another control circuit is provided as a branch of the towing vehicle's taillight circuit, and a control module includes switches for opening all the boat trailer circuits with a control which provides that for its intended operativity both those control circuits must be energized simultaneously, thus minimizing chances of inadvertent de-activation of the trailer's light circuitry when needed for highway use; and also included is a short-time delay circuit which provides against inadvertent de-activation of the trailer's light circuitry by the vehicle's gearing merely passing through "reverse" setting in shifting through that setting while the vehicle's taillight circuitry is energized.

5 Claims, 1 Drawing Figure

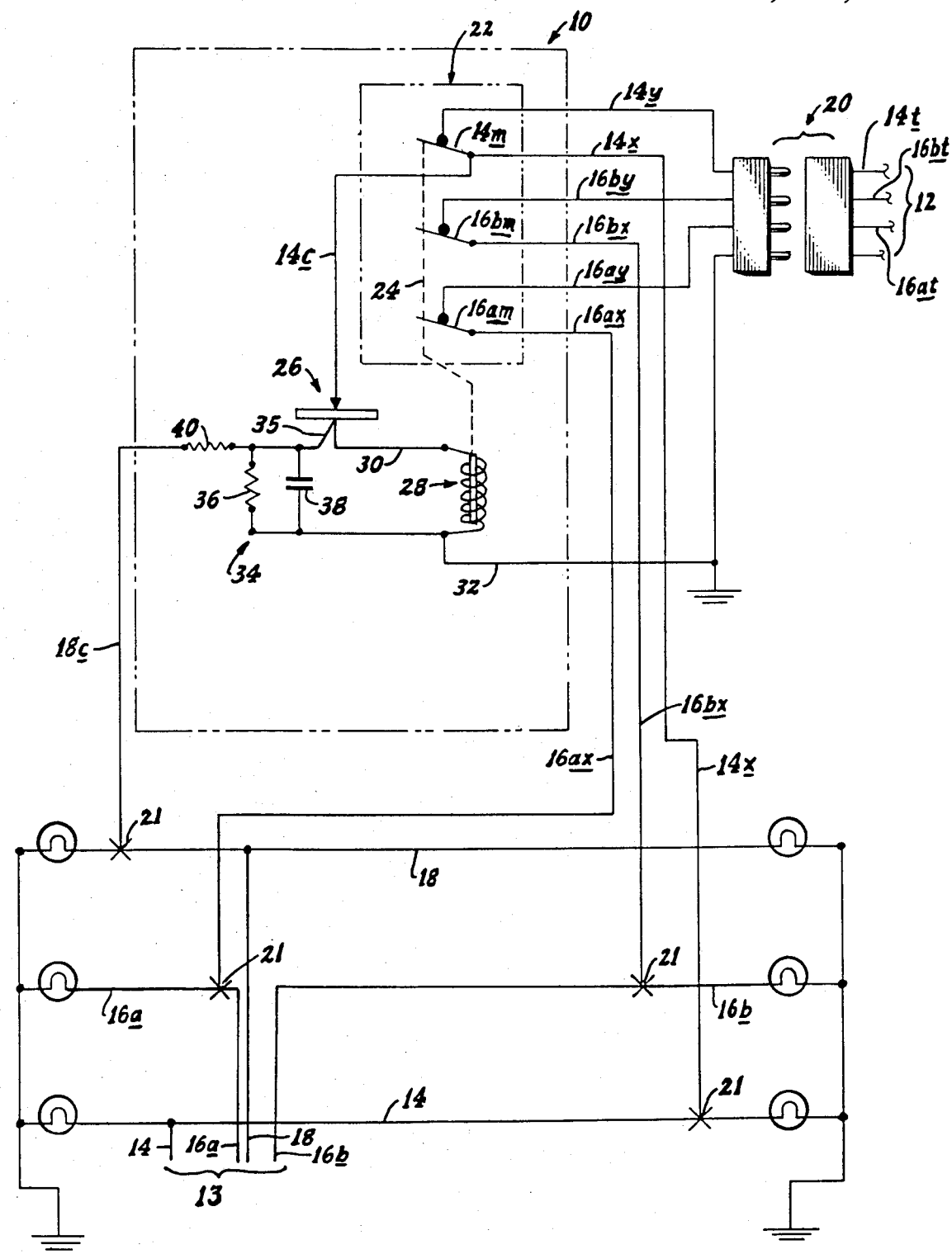

BOAT TRAILER LIGHT DE-ENERGIZATION MEANS

FIELD OF THE INVENTION

The present invention relates to electrical control means for use with boat trailers, and more particularly a control means for the boat trailer's light circuitry, which prevents the harmful short-circuiting of the trailer's light circuits when the trailer is backed into the water body of the lake or stream during the maneuvers of either launching a boat off the trailer, or retrieving the boat back onto the trailer.

The problem was existed for the many scores of years since boats have been made small enough to be carried on a trailer pulled by a towing vehicle, and towed to and from the water body in which the boat is to be used.

In the boat-towing procedure of towing the boat to and from the launch site, the boat trailer must be provided with lights, and these are conventionally energized by a connection to the electrical circuitry of the towing vehicle; and in that highway use, there is no particular likelihood of short-circuitry of a carefully-installed boat trailer circuitry.

However, much different conditions prevail at the launch site.

That is, in the use of a boat trailer in launching or retrieving a boat at the water body of the launch site, the boat trailer, while still connected mechanically and electrically to the towing vehicle, is backed down an inclined ramp which extends into the water body, permitting the floating nature of the boat to make the boat-releasing and boat-retrieval easy and convenient; but that maneuver, of backing the trailer into the water body, usually or at least often is to such an extent that some portion of the trailer's light circuitry is submerged into the water body, i.e., either there is submerged the trailer's taillights, stop-lights, turn-signal lights, backup lights, or perhaps some of the wiring of the trailer whose insulation has been worn, or perhaps the connector plug by which the trailer's circuitry is electrically and mechanically connected to the circuitry leading from the towing vehicle has not been placed high enough to avoid being submerged.

If any such circuitry is still energized when the trailer is in its partially-submerged state, i.e., if the user has not remembered to disconnect the trailer's connector plug, or even if the plug has been disconnected but the "tail" of wiring from the car has not been carefully placed high enough so that it itself is not submerged at the launch site, there will be a short-circuit by the grounding of the electrically energized component into the body of water at the launch site, causing at least the nuisance of a blown fuse.

Any blown fuse is of course quite bothersome, to say the least, causing loss of time temper, boating enjoyment, etc., as is of course well known.

To avoid this, the experienced boatsman will always try to remember to interrupt all other activities of the boat-launching and boat-retrieval procedure to always not only disconnect the boat trailer's electrical connector plug, but to carefully place safely the "tail" of vehicle's branch circuitry, i.e., the short length of circuitry which leads from the towing vehicle's circuitry and extends from the vehicle's trunk to the portion of the electrical plug to which the trailer's light circuitry is connected during highway-travel use.

This bother and inconvenience of procedure is at best a nuisance; and whenever it is forgotten a short circuit (and blown fuse) occurs whenever any of the trailer's light circuits are energized. That occurs, e.g., as the trailer's backup lights are energized in correspondency to those of the towing vehicle when the towing vehicle's gearing is shifted into "reverse"-gear setting; and perhaps other occasions, such as turning on light circuits of the towing vehicle during boat activity of low light, may cause the conditions which produce a short-circuit grounding of the trailer's circuitry at the launch site.

THE INVENTIVE CONCEPTS SUMMARIZED

Preventing these inadvertent short circuits, the present invention provides a control module which is easily positioned in the towing vehicle's trunk, and connected to the wiring harness or circuitry which leads from the vehicle's wiring accessible in the vehicle's trunk.

Switches are provided for de-energizing of the trailer's circuits; and to activate these switches there are two co-ordinated circuits provided. One of them is connected to one of the vehicle's electric circuits to provide the switch-opening function; but to make that circuit desirably generally inoperative to do that, a circuit connected to the vehicle's backup light circuitry is provided, and the control is such that both of those control circuits must be energized simultaneously. This takes advantage of the boat-launching and retrieval functions generally requiring a backing up of the towing vehicle, automatically avoiding an inadvertent switch-opening effect.

Other features provide a circuit-maintaining operativity, so that the switches are then kept in circuit opening condition even though the vehicle's gear be shifted out of "reverse" setting, and a time-delay function so that switch-opening is not unintentionally caused by the shifting of the towing vehicle's gearing momentarily through the "reverse" position.

All the connections to the towing vehicle's wiring may be merely of the "clip-on" type of which energization is achieved from wiring generally accessible in the towing vehicle's trunk.

PRIOR ART

All the components may be provided from known components, of wiring, clip-on terminals, gang switches, hold-down relay, switching desirably including an SCR, and resistors and a condenser.

This availability of all components, and the existence of control circuits as a desired feature of other devices, plus the results of a search of prior art in the U.S. Patent Office made after this invention, helps to show the inventive nature of the concepts here detailed as providing this advantageous control which achieves a solution to a problem known to for scores of years to probably millions of persons and to the competitive field of automotive and boating accessories.

That search, made in several classes and sub-classes of the Patent Office search files, disclosed but three references, but none showing the advantageous two-circuit control, with switch-opening maintaining and the delay feature, all of which provide and co-operate to achieve the automatic safety against boat trailer light circuit short-circuits as here described.

Those three references, although quite incomplete either individually or aggregatively as suggesting the present concepts, are noted as follows:

U.S. Pat. No. 3,437,994 Forsberg, 1969
U.S. Pat. No. 4,013,996 Hubbard, 1977
U.S. Pat. No. 4,024,497 Ruppel, 1977

The above description is of somewhat introductory and generalized form. More particular details, concepts, and features are set forth in the following and more detailed description of an illustrative embodiment, taken in conjunction with the accompanying drawings.

BRIEF DESCRIPTION OF THE DRAWING

The drawing is of somewhat of a generally schematic or diagrammatic nature for illustrating the inventive concepts. In the drawing:

The single FIGURE of Drawing is an electrical schematic drawing, diagrammatically illustrating the inventive concepts, in a preferred embodiment, as installed in the boat-towing vehicle, and connected to both the circuitry of the boat-towing vehicle and the boat trailer, all parts and components being indicated schematically.

DETAILED DESCRIPTION OF PREFERRED EMBODIMENT

As shown in the drawings, the concepts of the invention provide an advantageous control unit or module 10 which provides an automatic means for preventing a short in a boat trailer's electrical circuitry 12 at a boat launch site, that is, a short circuit which would occur when any of the trailer's electrical components would touch the water of the lake or stream while the electrical connection of the trailer to the towing vehicle was maintained, while the corresponding circuitry of the towing vehicle was energized.

As conventionally with boat trailer lighting systems, boat trailers are provided with several light circuits, desirable and required for use of the trailer in towing a boat over public streets and highways; and the concepts of the present invention advantageously make use of branches of the electrical circuitry 13 of the towing vehicle.

The towing vehicle's circuitry 13 energization is merely shown schematically as input leads of the circuitry 13, that being simply a schematic showing since it is assumed to be wholly conventional, energizing various of the towing vehicle's lights, with proper switches, fuses, etc., (not shown) to ground, all conventional, for a towing vehicle of modern vintage having "backup" lights.

More particularly, the invention and its operativity utilize from the boat-towing vehicle two of its electric energization circuits, as herein specified, from the towing vehicle's various circuits, i.e. the towing vehicle's circuitry 14 for the vehicle's headlights, taillights, and parking lights, the circuitry 16 for the vehicle's stop lights and turn signal lights (here shown as 16a and 16b for left and right units, respectively) and circuitry 18 for the vehicle's backup lights. In use of the latter, i.e., the circuitry 18 of the vehicle's backup lights, advantage is taken of the facts that the backup light circuit 18 is automatically energized by the vehicle's gear being in "reverse" or backup setting, and the fact that in boat-launching or boat-retrieval the vehicle will normally be backed up toward the launch-site water, thus assuring that the vehicle's gear will have been in reverse-gear setting as an inherent incident to the maneuver.

The invention also assumes that the boat trailer, as is conventional, is also provided with trailer lights and light circuitry generally corresponding to those of the vehicle; and for hopeful ease of understanding, similar reference numerals are used for the trailer circuits, but with a suffix "t". This trailer circuitry conventionally thus includes at least circuitry 14t for the trailer's tail lights, and circuitry 16t for the trailer's stoplights and turn signal lights (here shown as 16at and 16bt for left and right units, respectively).

Of course the towing vehicle and the boat trailer may have other circuitry, but the circuitry designated for them herein illustrates the inventive concepts and their operativity; and thus the trailer circuitry 12 is shown here by its circuits 14c, 16at, and 16bt.

Also as conventional, as shown in the illustrative embodiment, the towing vehicle is provided with branch circuitry leading from whatever are its various vehicle energization circuits to corresponding circuits of the boat trailer. These branch circuits are also shown with the same reference numerals as those of the various towing vehicle-circuits, but followed by suffices "x" and "y", respectively to indicate the portions leading to and from the control unit 10; i.e., the branch circuits between the vehicle circuits and the control unit 10 have a suffix "x", and the branch circuits between the control unit 10 and the connector plug 20 for the trailer are provided with a suffix "y".

Thus, from the vehicle to the trailer, the taillight circuitry is 14, 14x, 14y, and 14t; the turn light and stop light circuitry is, respectively for left and right, 16a, 16ax, 16ay, and 16at, and 16b, 16bx, 16by, and 16bt. The backup light circuitry 18 of the vehicle, although used as specified below, is not shown with any corresponding circuitry for the trailer. Clips 21 are shown for connections to the towing vehicle's circuits.

According to the inventive concepts, control unit or module 10 includes a switch means 22 in the vehicle's branch circuitry 14a, 16ax, and 16bx which leads respectively to the corresponding circuits 14y and 14t, 16ay and 16at, and 16by and 16bt of the boat trailer; and in the switch means 22 there is at least one switch means for each such branch circuit of the branch circuitry. Each of those individual switch means are represented by the movable switch blades having "m" suffix added to a numeral indicating the particular branch circuit, thus respectively, 14m, 16am, and 16bm.

Also there is provided a switch-opening means, here shown as a control link 24 connected (insulatedly of course) to all the switch blades 14m, 16am, and 16bm, and which is operative to open all of those switches as a gang.

The invention includes the use of two control citcuits, and they are both energized by circuitry of the vehicle, as now specified.

The first of these to be described is a first control circuit means 18c, it being operatively connected to the vehicle's backup light circuitry 18 for energization in correspondence therewith; and the "c" suffix is used to indicate a control nature, it being one of the two control circuits referred to above. (The trailer may have backup lights, which would then be switched by another individual switch of the gang switch unit 22; but for cimplicity such additional circuits are not shown.) The operativity of this first control circuit 18c is described below.

There is also provided a second control circuit means 14c, it being operatively connected to a selected another one of the vehicle's circuits for energization in correspondence therewith, that selected other vehicle circuit being desirably the taillight circuit 14, hence its reference designation 14c.

The second control circuit means 14c includes a switch means 26, here an SCR, which is normally open, but, when this switch means 26 is closed, and if its energization circuit (here the vehicle's taillight circuit 14) is energized, that circuit 14 being connected to branch circuit 14x, to which the control circuit 14c is connected as by connection to the hot side of switch 14m, that second control circuit means 14c is operative to open and hold open all of the switch means of gang switch unit 22 (14m, 16am, and 16bm) by energization of the switch-opening link 24; and this switch-opening operativity of link 24 is by its connection to the movable armature of a solenoid device 28 whose coil is in a portion of the control circuit 14c, the portion from the SCR 26 to the solenoid 28 being shown as 30, and the portion from the solenoid 28 to ground being shown as 32.

The resulting opening of all switches of the gang unit 22 accordingly opens all circuitry 12 of the trailer lights, thereby de-energizing them, when the above-mentioned conditions are met, as further detailed herein.

It will be noted that the first control circuit means 18c is operative, when energized by the vehicle's backup light circuitry 18, to close the SCR switch means 26 of the second control circuit means 14c, providing the actuation of the solenoid 28 and its link 24 to de-energize the trailer light circuitry 12 by opening the gang switch means in the vehicle's branch circuitry 14x, 16ax, and 16bx.

Further, it is to be noted that the second control circuit means 14c also maintains an open-switch condition of the gang switch means 22 of the vehicle's branch circuitry 14x, 16ax, and 16bx, which leads to corresponding circuits of the boat trailer, even though the condition of the vehicle's gear being in reverse-gear setting thereafter may not or does not exist, i.e., after energization of the first control circuit 18c is no longer existing; and in the form shown this is due to the second control circuit 14c (and its portions 30 and 32 of course) performing a hold-down operativity as to solenoid 28 once it is energized by both conditions having existed simultaneously, i.e., the vehicle's gear being in "reverse" setting, thus energizing control circuit 18c, and the vehicle's taillight circuit 14 being turned "on", thus energizing the solenoid 28 by current flow through components 14x, 14m, 14c, 26, 30, 28, and 32, to ground.

Also, the inventive concepts provide for the first control circuit means 18c an advantageous time-delay means 34. Its components being described below, the delay means 34 provides a delay of a short but significantly long duration, providing the advantage that the first control circuit means 18c (energized by the backup light circuit 18) will not be instantly operative to achieve its control function of the energization of that control circuit 18c causing a closing of the SCR switch means 26 of the second control circuit means 14c; and this brief delay is advantageous because otherwise the closing of the switch of the SCR 26 would be operative to actuate the switch-opening solenoid 28 and link 24 to open the gang switch means 22 in the vehicle's branch circuitry (the "x"-suffix components) leading to corresponding branch circuits (the "y"-suffix components) which lead to corresponding circuitry 12 (the "t"-suffix components) of the boat trailer, unless the condition of the vehicle's gear in reverse-gear setting has existed longer than the fraction of a second which is used in changing the vehicle's gear from a setting of "forward" drive to a "park" condition and vice versa, for conventionally vehicles' gearing is that a shift between the latter conditions inherently requires an intermediate passing through a "reverse" setting.

With further reference to the SCR 26, as shown, its anode is operatively connected to the second control circuit means 14c, the gate 35 of the SCR being operatively connected to the first control circuit means 18c; and the delay circuitry is provided for the first control circuit means 18c to prevent the gating of the SCR until the first control circuit means 18c has been energized for the time period of the delay means 34, achieving the desired delay effect as to permitting current flow in the second control circuit 14c through the SCR, branch 30, solenoid 28, and branch 32 to ground, only after the desired delay. The delay circuitry as shown comprises a resistor 36 and a condenser 38 in parallel to one another and to the gate circuit through SCR gate 35. In the desired embodiment shown, the resistor is 10 Kohm and the condenser is 100 MF. The relay is of 12 volt DC type with the voltage of current era vehicles; and there is desirably provided a 6.8 Kohm resistor 40 in the control circuit 18c.

SUMMARIZATION

It is thus seen that a safety means is provided and accomplished, for preventing short circuits of a towing vehicle's electrical system by an electrically energized trailer circuit or component or component grounding out in the water of the launch site.

Thus the concepts provide a desirable and advantageous device when made according to the inventive concepts, and provides desired and advantageous improvements for an electrical control means particularly achieving that safety by the user merely turning "on" a single circuit of the towing vehicle, and without having to worry about unplugging the trailer's connection plug.

Accordingly, it will thus be seen from the foregoing description of the invention and its concepts according to this illustrative embodiment, considered with the accompanying drawings, that the present invention provides in combination, a short-preventing control, substantially automatic in its operativity both in launching and retrieving a boat in a customary manner, the device being easy to attach onto any towing vehicle's electrical circuitry, and to disconnect therefrom for use on another vehicle if desired, not bothersome in use, and in general providing utility from various standpoints such as pointed out herein, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

I claim:

1. A control means including control circuitry therefor, which prevents short circuit conditions of a boat trailer's light-circuitry at the boat-launch site, the means and control circuitry comprising, in combination:
    at least two co-ordinated control circuits,
    a first one of the control circuits being provided to a
        branch of the vehicle's backup lights' circuitry,
        utilizing the fact of the boat-launch and retrieval
        maneuver of the towing vehicle normally including a reverse-drive action of the towing vehicle, thereby assuring energizing of that first control circuit, another of the control circuitry being provided as a branch of another of the towing vehicle's circuitry, and a control module including switches for opening the boat trailer light-circuitry, the control means providing that for its said operativity both those control circuits must be energized simultaneously, thus minimizing chances of inadvertent de-activation of the trailer's light-circuitry when needed for highway use.

2. The control means and circuitry as set forth in claim 1, in a combination in which there is also included a short-time delay circuit which provides against inadvertent de-activation of the trailer's light-circuitry by the vehicle's gearing merely passing through "reverse" setting in shifting through that setting while the vehicle's said another circuitry is energized.

3. The control means and circuitry as set forth in claim 1, in a combination in which the said another of the control circuitry has a control switch means which is normally open but which is closed upon energization of the said first control circuitry to permit the energization of the said another of the control circuitry to open the switches of the boat trailer's circuitry.

4. The control means and circuitry as set forth in claim 3, in a combination in which includes a short-time delay circuit which delays closure of the control switch means, thereby providing against inadvertent de-activation of the trailer's light-circuitry by the vehicle's gearing merely passing through "reverse" setting in shifting through that setting while the vehicle's said another circuitry is energized.

5. The control means and circuitry as set forth in claim 4, in a combination in which the said control switch means is an SCR, and the delay circuit provides a short-time delay in the gating of the SCR's anode circuit, the SCR's anode circuit being operative to provide the energization of the said another of the control circuitry to open the boat trailer's light-circuitry.

* * * * *